United States Patent
Darrow, Jr. et al.

(10) Patent No.: US 10,358,212 B2
(45) Date of Patent: Jul. 23, 2019

(54) AIRCRAFT ROTOR ASSEMBLY WITH COMPOSITE LAMINATE

(71) Applicant: Sikorsky Aircraft Corporation, Stratford, CT (US)

(72) Inventors: David A. Darrow, Jr., Stratford, CT (US); Frank P. D'Anna, Seymour, CT (US); Stephen V. Poulin, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 603 days.

(21) Appl. No.: 14/915,232

(22) PCT Filed: Jun. 16, 2014

(86) PCT No.: PCT/US2014/042505
§ 371 (c)(1),
(2) Date: Feb. 27, 2016

(87) PCT Pub. No.: WO2015/030904
PCT Pub. Date: Mar. 5, 2015

(65) Prior Publication Data
US 2016/0207621 A1    Jul. 21, 2016

Related U.S. Application Data

(60) Provisional application No. 61/871,095, filed on Aug. 28, 2013, provisional application No. 61/871,135, filed on Aug. 28, 2013.

(51) Int. Cl.
*B64C 27/35*    (2006.01)
*B64C 27/39*    (2006.01)
(Continued)

(52) U.S. Cl.
CPC .............. *B64C 27/39* (2013.01); *B64C 27/35* (2013.01); *B64C 27/473* (2013.01); *B64C 27/54* (2013.01); *B64C 2027/4736* (2013.01)

(58) Field of Classification Search
CPC ......... B64C 27/35; B64C 27/39; B64C 27/54; B64C 27/473; B64C 2027/4736;
(Continued)

(56) References Cited

U.S. PATENT DOCUMENTS 4,425,082 A * 1/1984 Mussi ..................... B64C 27/32
416/134 A
4,568,245 A    2/1986 Hibyan et al.
(Continued)

OTHER PUBLICATIONS

EP SR, issued Mar. 24, 2017, EP application No. 14840892.5, 8 pages.
(Continued)

*Primary Examiner* — Ninh H. Nguyen
*Assistant Examiner* — Brian P Wolcott
(74) *Attorney, Agent, or Firm* — Cantor Colburn LLP (57) ABSTRACT

An aircraft is provided and includes an airframe, a blade disk, which is rotatable relative to the airframe, including a plurality of rotor blades, a rotor shaft disposed to drive rotation of the blade disk relative to the airframe and a pitching of each of the rotor blades about corresponding pitch axes and a rotor assembly configured to form couplings by which each of the rotor blades is coupled to the rotor shaft. The rotor assembly includes a composite laminate arranged to resolve loading associated with the couplings in-plane of the composite laminate.

10 Claims, 6 Drawing Sheets

(51) Int. Cl.
*B64C 27/54* (2006.01)
*B64C 27/473* (2006.01)

(58) Field of Classification Search
CPC ........ F04D 19/024; F04D 29/20; F04D 29/34;
F05B 2220/309
See application file for complete search history.

(56) References Cited

U.S. PATENT DOCUMENTS

| | | | | |
|---|---|---|---|---|
| 4,797,064 | A | * | 1/1989 | Ferris ................ B64C 27/32 416/134 A |
| 4,818,179 | A | * | 4/1989 | Toner ................ B64C 27/32 416/134 A |
| 4,868,962 | A | | 9/1989 | McArdle et al. |
| 4,915,585 | A | * | 4/1990 | Guimbal ............ B64C 27/51 416/107 |
| 4,930,983 | A | * | 6/1990 | Byrnes .............. B29C 70/887 416/134 A |
| 8,496,435 | B2 | * | 7/2013 | Nannoni ............ B64C 27/32 416/134 A |
| 2007/0181741 | A1 | * | 8/2007 | Darrow, Jr. ......... B64C 1/00 244/17.23 |

OTHER PUBLICATIONS

International Search Report, International Application No. PCT/US2014/042505, dated Nov. 4, 2014, pp. 1-5.
Written Opinion, International Application No. PCT/US2014/042505, dated Nov. 4, 2014, pp. 1-6.

* cited by examiner

AIRCRAFT ROTOR ASSEMBLY WITH COMPOSITE LAMINATE

CROSS REFERENCE TO RELATED APPLICATIONS

This application claims the benefit of priority to U.S. Provisional Application No. 61/871,095, which was filed on Aug. 28, 2013, and to U.S. Provisional Application No. 61/871,135, which was filed on Aug. 28, 2013. The entire contents of U.S. Provisional Application No. 61/871,135 are incorporated herein by reference.

STATEMENT REGARDING FEDERALLY SPONSORED RESEARCH OR DEVELOPEMENT

This invention was made with government support under Technology Investment Agreement No. W911W6-13-2-0003 awarded by the Army. The government has certain rights in this invention.

BACKGROUND OF THE INVENTION

The subject matter disclosed herein relates to an aircraft and, more particularly, to an aircraft having a rotor assembly with a composite laminate.

An aircraft may be configured, for example, as a coaxial, counter-rotating helicopter with a rear propeller or any other type of helicopter or rotary aircraft. Such an aircraft includes an airframe that is formed to define a cabin that can accommodate a pilot and, in some cases, one or more crewmen or passengers. The airframe has a top portion and a tail portion. The aircraft further includes at least one more blade disks, which are operably disposed at the top portion and the tail portion and which are rotatable about corresponding rotational axes relative to the airframe.

For at least the blade disks at the top portion of the airframe, the aircraft further includes a rotor shaft and a rotor assembly. The rotor shaft extends upwardly through the airframe and is operably disposed to drive rotation of the blade disks. The rotor assembly is configured to couple a corresponding one of the blade disks to the rotor shaft.

BRIEF DESCRIPTION OF THE INVENTION

According to one aspect of the invention, an aircraft is provided and includes an airframe, a blade disk, which is rotatable relative to the airframe, including a plurality of rotor blades, a rotor shaft disposed to drive rotation of the blade disk relative to the airframe and a pitching of each of the rotor blades about corresponding pitch axes and a rotor assembly configured to form couplings by which each of the rotor blades is coupled to the rotor shaft. The rotor assembly includes a composite laminate arranged to resolve loading associated with the couplings in-plane of the composite laminate.

In accordance with additional or alternative embodiments, the blade disk is disposed at an upper portion of the airframe and is provided as a first, upper blade disk and a second, lower blade disk and wherein the rotor shaft drives the first and second blade disks to rotate coaxially in opposite directions.

In accordance with additional or alternative embodiments, each of the couplings permits pitching, flapping and leading/lagging of the corresponding one of the rotor blades.

In accordance with additional or alternative embodiments, the rotor assembly is polygonal with a number of rounded corners equaling a number of the rotor blades, each rounded corner defining a location of an a corresponding one of the couplings.

In accordance with additional or alternative embodiments, the composite laminate includes graphite and epoxy.

In accordance with additional or alternative embodiments, the rotor assembly includes multiple composite laminates and the multiple composite laminates include a composite laminate base element formed to define an outward facing channel, a composite laminate hoop element disposed in the channel and upper and lower composite laminate plate elements supportive of the composite laminate base element relative to the rotor shaft.

In accordance with additional or alternative embodiments, the outward facing channel is c-shaped.

In accordance with additional or alternative embodiments, the composite laminate hoop element includes unidirectional graphite.

In accordance with additional or alternative embodiments, the upper and lower composite laminate plate elements are tapered proximate to the couplings.

In accordance with additional or alternative embodiments, the rotor assembly includes multiple composite laminates and the multiple composite laminates include a composite laminate base element, which is formed to define an outward facing channel and which is coupled to the rotor shaft by spoke elements and a composite laminate hoop element disposed in the channel.

According to yet another aspect of the invention, a rotor assembly to form couplings by which rotor blades of an aircraft blade disk are coupled to a rotor shaft is provided. The rotor assembly includes a composite laminate arranged to resolve loading associated with the couplings in-plane of the composite laminate.

In accordance with additional or alternative embodiments, the rotor assembly includes multiple composite laminates and the multiple composite laminates include a composite laminate base element formed to define an outward facing channel, a composite laminate loop element disposed in the channel and upper and lower composite laminate plate elements supportive of the composite laminate base element relative to the rotor shaft.

In accordance with additional or alternative embodiments, the outward facing channel is c-shaped.

In accordance with additional or alternative embodiments, the composite laminate loop element includes unidirectional graphite.

In accordance with additional or alternative embodiments, the upper and lower composite laminate plate elements are tapered proximate to the couplings These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a rigid rotor composite structural configuration is provided. Conical graphite epoxy shells are combined with an outer graphite epoxy C-channel hoop to react bending loads. A unidirectional graphite tape belt reacts centrifugal loading blade-to-blade With reference to FIG. 1, an aircraft 10 is provided and may be configured, for example, as a coaxial, counter-rotating helicopter 11 with a rear propeller or any other type of helicopter or rotary aircraft. In any case, the aircraft 10 includes an airframe 12 that is formed to define a cabin that can accommodate a pilot and, in some cases, one or more crewmen or passengers. The airframe 12 has a top portion 121 and a tail portion 122. The aircraft 10 further includes at least one more blade disks 13, which are operably disposed at the top portion 121 and the tail portion 122 and which are rotatable about corresponding rotational axes relative to the airframe 12. Each blade disk 13 includes a plurality of rotor blades 130 that extend outwardly from a hub 131 and which are each pivotable about a corresponding pitching axis.

Figure 1:
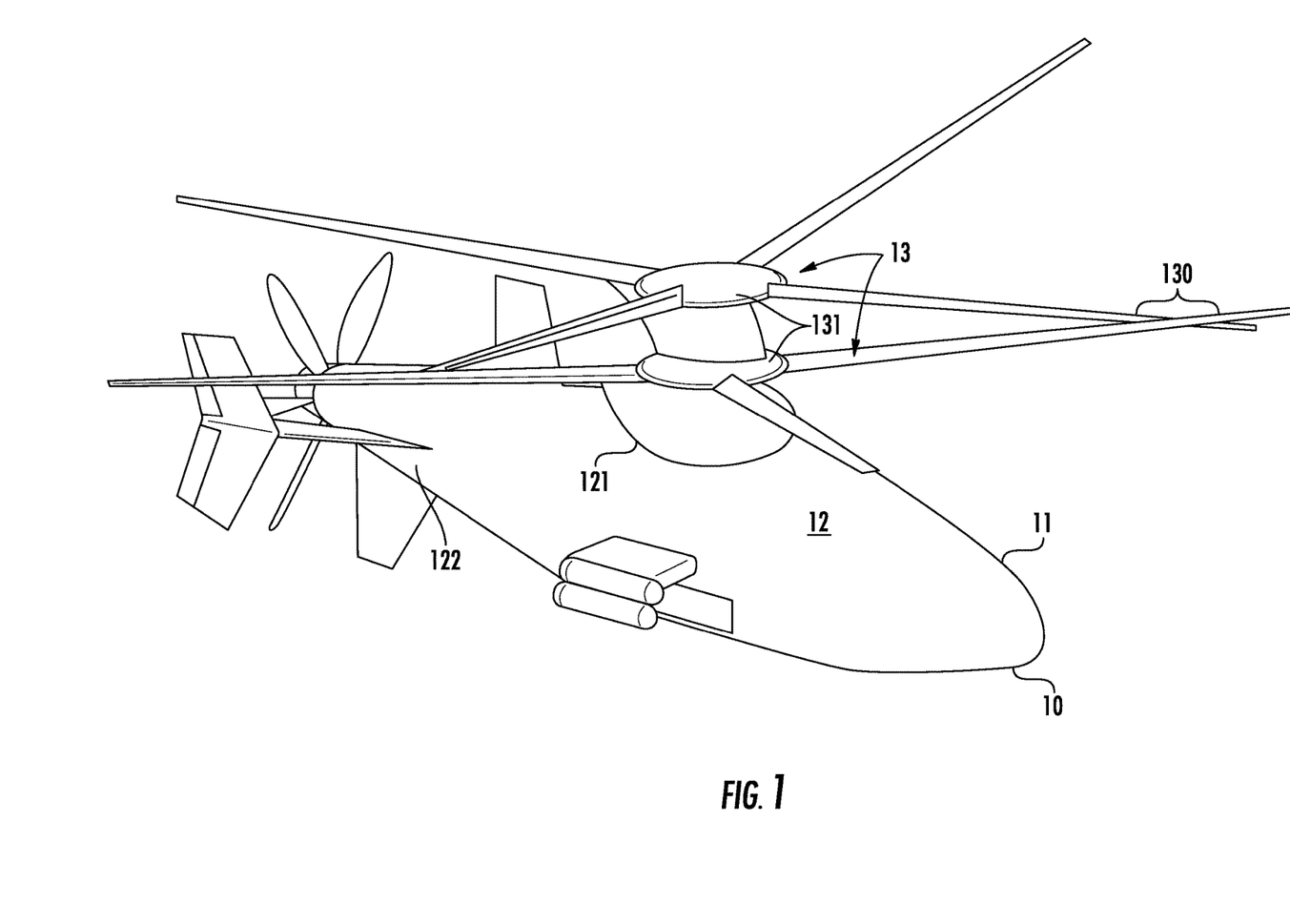
FIG. 1 is a perspective view of an aircraft in accordance with embodiments.
Figure 2:
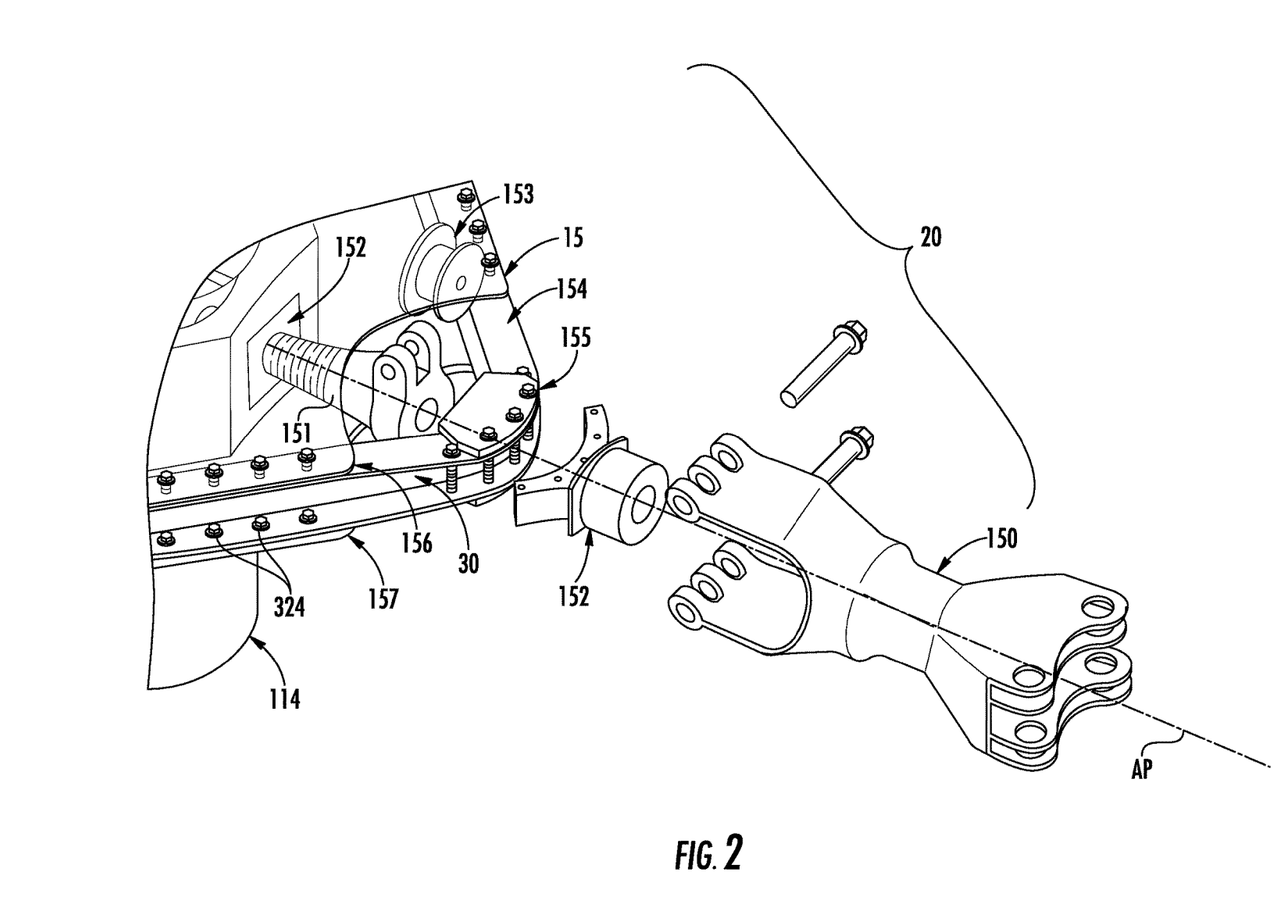
FIG. 2 is a perspective view of a rotor assembly of the aircraft of FIG. 1 in accordance with embodiments.
Figure 3:
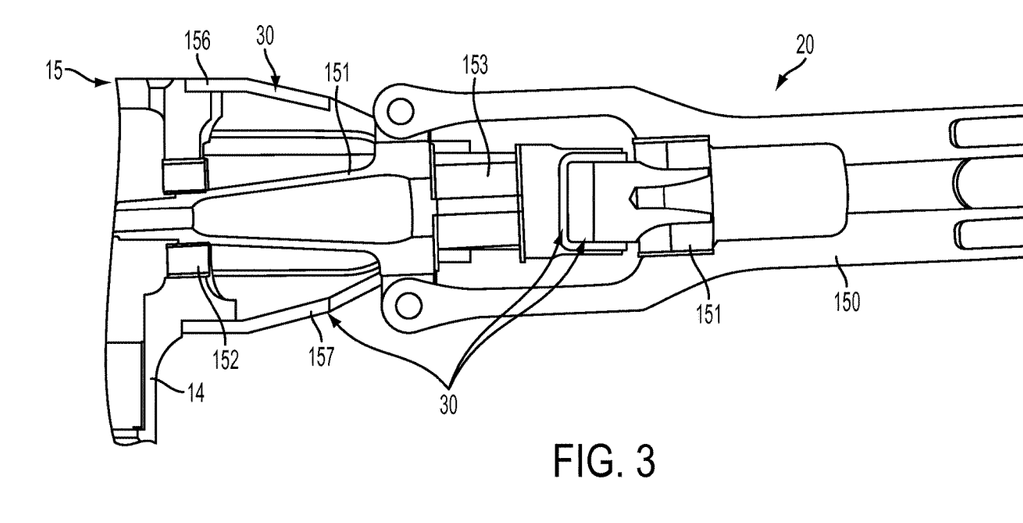
FIG. 3 is a side view of the rotor assembly of FIG. 2 in accordance with embodiments.

With reference to FIGS. 1 through 3, for at least the blade disks 13 at the top portion 121 of the airframe 12, the aircraft 10 further includes a rotor shaft 14 and a rotor assembly 15. The rotor shaft 14 extends upwardly through the airframe 12 and is coupled to an engine and a transmission of the aircraft 10. As such, the rotor shaft 14 is operably disposed to drive rotation of the blade disks 13 relative to the airframe 12 about the rotational axis. In addition, the rotor shaft 14 is coupled to a control system of the aircraft 10 and is thereby disposed to drive a collective and/or cyclic pitching of each of the rotor blades 130 about their corresponding pitch axes. The rotor assembly 15 is configured to form couplings 20 by which each of the rotor blades 130 is coupled to the rotor shaft 14. Each of the couplings 20 permits pitching, flapping and leading/lagging of the corresponding one of the rotor blades 130.

In accordance with embodiments, the blade disks 13 at the top portion 121 of the airframe 12 may be provided as a first, upper blade disk 13 and a second, lower blade disk 13. In such cases, two rotor shafts drive the first and second blade disks 13 to rotate coaxially in opposite directions.

In accordance with embodiments, the rotor assembly 15 includes a yoke element 150 and a stem element 151 and a plurality of corresponding bearings. The yoke element 150 is interposed between the corresponding rotor blade 130 and the stem element 151. The stem element 151 serves to couple the yoke element 150 to the rotor shaft 14. The plurality of corresponding bearings includes inboard and outboard pitch bearings 152 that permit pitching of the rotor blade 130 about the pitching axis $A_P$ while resisting flapping and leading/lagging of the rotor blade 130 and a thrust bearing 153 that permits pitch movement of the rotor blade 130 as well as restricting radial movement.

The rotor assembly 15 may have a polygonal shape, such as a diamond, with a number of sides 154 and a number of rounded corners 155 equaling a number of the rotor blades 130 (i.e., 4 sides 154 and 4 rounded corners 155 for each of the 4 rotor blades 130). Each rounded corner 155 defines a location of a corresponding one of the couplings 20 with each of the couplings 20 for each of the rotor blades 130 including a yoke element 150 and a stem element 151, one inboard and one outboard pitch bearing 152 and one thrust bearing 153. The rotor assembly 150 further includes a composite laminate 30, such as a combination of graphite and epoxy in accordance with an exemplary embodiment, which is arranged to resolve loadings associated with each of the couplings 20.

The loadings associated with each of the couplings 20 are generated by several factors including, but not limited to, the centrifugal force applied to the rotor assembly 15 by the rotation of the rotor blades 130 and the tendency of the rotor blades 130 to flap. This centrifugal force is directed radially outwardly from the rotor shaft 14 to the rotor blades 130 and through each of the stem elements 151 and each of the yoke elements 150. Thus, in the case of the number of rotor blades 130 being 4 and the rotor assembly 15 having a polygonal (i.e., diamond) shape with each rounded corner 155 defining a location of a coupling 20, the rotor assembly 15 absorbs and resolves the loadings associated with each of the couplings 20 along the sides 154 of the rotor assembly 15 as well as a top 156 and bottom 157 of the rotor assembly 15.

Figure 4:
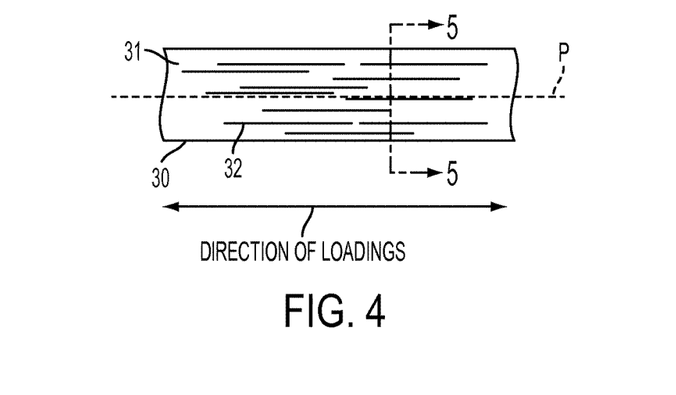
FIG. 4 is a side view of a composite laminate of the rotor assembly of FIG. 2 in accordance with embodiments.
Figure 5:
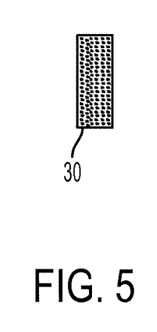
FIG. 5 is an axial view of the composite laminate of FIG. 3 taken along line 5-5 in FIG. 4.

With reference to FIGS. 4 and 5, the composite laminate 30 is formed to define a plane P and the loading resolution at each of the couplings 20 is achieved in the plane P of the composite laminate 30. That is, in the case of the composite laminate 30 being formed of a combination of graphite and epoxy, the epoxy serves as a matrix 31 and the graphite is suspended within the matrix 31 as a planar or fibrous material 32 that is configured to extend longitudinally along the plane P. Thus, with the loading resolution of each of the couplings 20 being in the plane P, the loadings are resolved by the composite laminate 30 with the material 32 placed in tension.

With reference to FIGS. 2, 3, 6 and 7 and, in accordance with further embodiments, the rotor assembly 15 may include multiple composite laminates 30. The multiple composite laminates 30 may include a composite laminate base element (hereinafter referred to as a "base element") 300, a composite laminate loop element (hereinafter referred to as a "hoop element") 310, a composite laminate top plate (hereinafter referred to as a "top plate") 320 and a composite laminate bottom plate (hereinafter referred to as a "bottom plate") 330.

Figure 6:
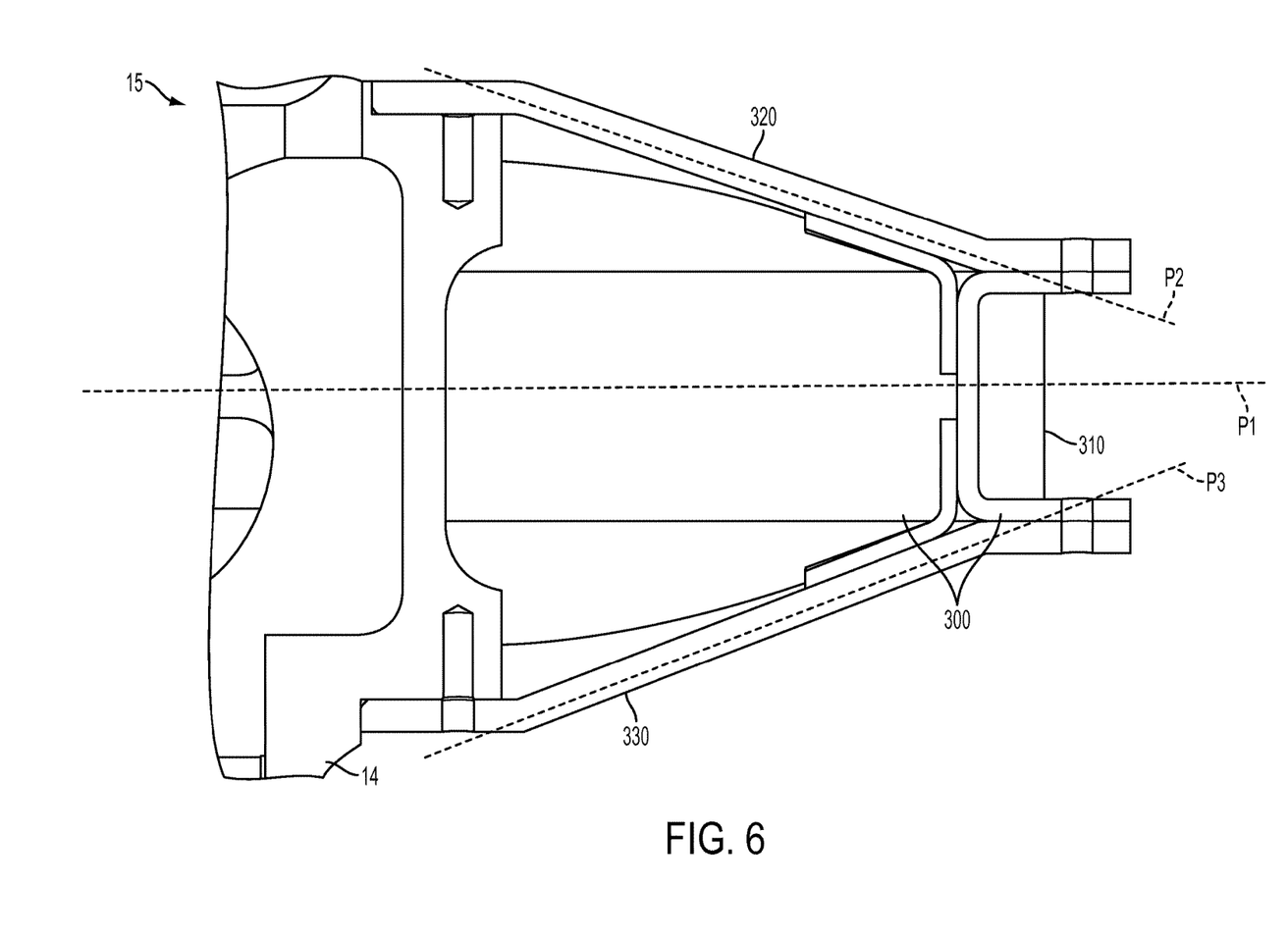
FIG. 6 is a cutaway perspective view of the rotor assembly of FIG. 2.
Figure 7:
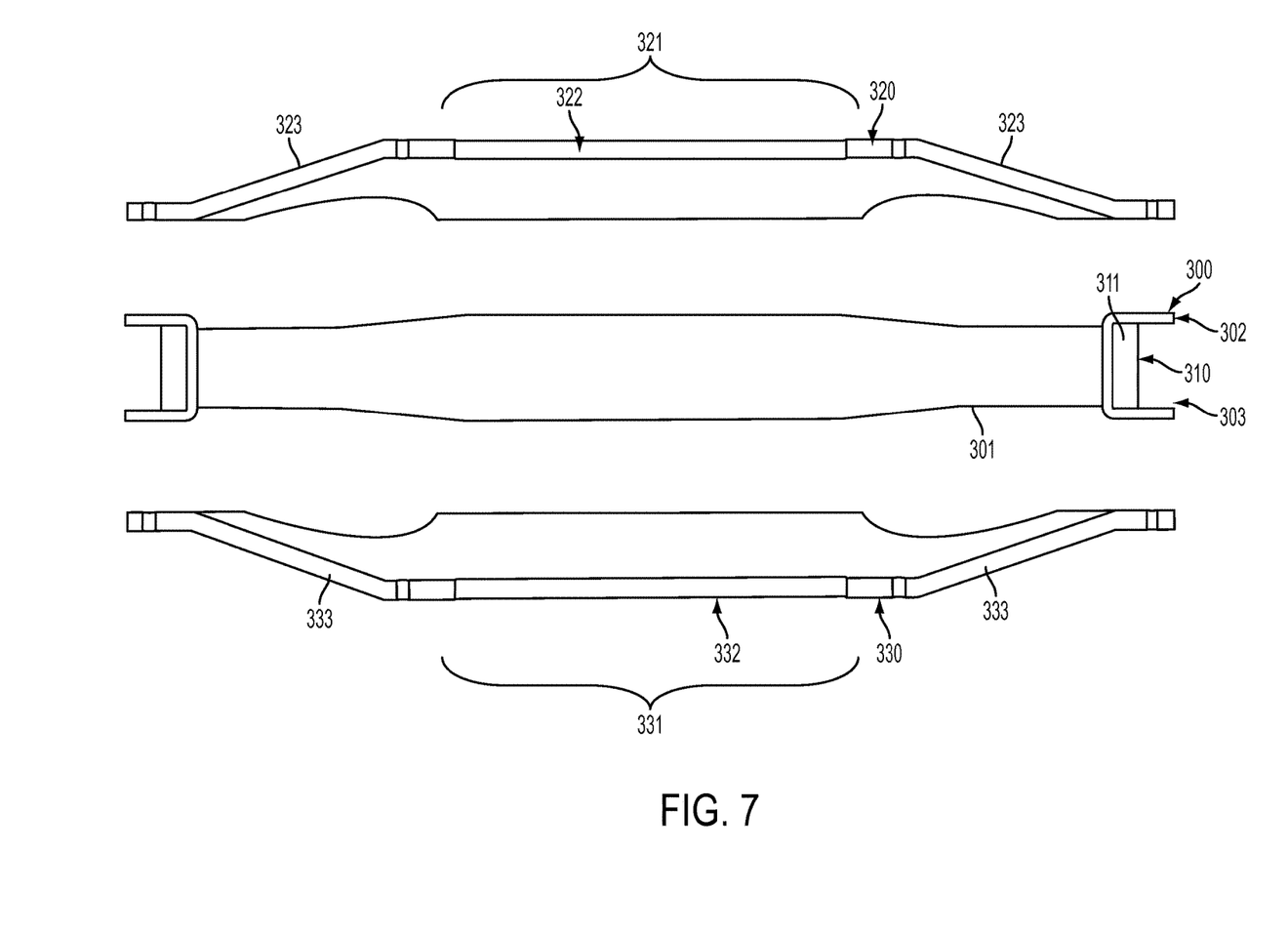
FIG. 7 is an exploded side view of a composite laminate of the rotor assembly of FIGS. 2, 3 and 6.

The base element 300 forms the shape of the rotor assembly 15 and, in the case of the rotor assembly 15 being a diamond, the base element 300 is diamond-shaped with the 4 sides 154 extending along a plane P1 of the base element 300 and the 4 rounded corners 155 defining the locations of the couplings 20. The base element 300 includes a main member 301 and legs 302 that extend outwardly from opposite ends of the main member 301 such that the base element 300 has a cross-sectional shape formed to define an outward facing c-shaped channel 303 in which the hoop element 310 may be seated. The legs 302 may be coupled to the thrust bearings 153 by pins extending through the thrust bearings 153 and the legs 302 that are secured by base elements to be described below on opposite sides of the base element 300. However, it is understood that other mechanisms can be used to couple the legs 302 and the bearings 153 in other aspects.

Where the base element 300 is formed of a composite of for example graphite and epoxy, the epoxy serves as the matrix 31 and the graphite is suspended within the matrix 31 as the planar or fibrous material 32 configured to extend longitudinally along the plane P1. While not required in all aspects, the materials 32 can be laid up in 45° angles. As such, the loadings of the couplings 20 at the rounded corners 155 are resolved by the base element 300 with the material 32 in tension. However, it is understood that other fibrous materials can be used in addition to or instead of graphite and/or at different angles, and other materials can be used as the matrix 31 in addition to epoxy in other aspects.

The hoop element 310 is tightly disposed in the outward facing channel 303 and thus assumes the shape of the base element 300. The hoop element 310 has a body 311, which may have a substantially rectangular cross-sectional shape such that the hoop element can sit in an inner-most portion of the outward facing channel 303 within the plane P1. In a case where the interior corners of the outward facing channel 303 are rounded, the hoop element 310 may have correspondingly rounded interior corners as well such that the hoop element 310 sits flush within the inner-most portion of the outward facing channel 303.

Where the hoop element 310 is formed of a composite of for example graphite or, more particularly, unidirectional graphite and epoxy, the epoxy serves as the matrix 31 and the graphite (or unidirectional graphite) is suspended within the matrix 31 as the planar or fibrous material 32 configured to extend longitudinally along the plane P1. As such, the loadings of the couplings 20 at the rounded corners 155 are also resolved by the hoop element 310 with the material 32 in tension.

By way of example, the fibrous material 32 of the hoop element 310 could be laid up at 0° so that the fibers 32 react the centrifugal forces of the coupling 20, while other forces of the coupling 20 are reacted by the C-shaped channel 303 having material 32 laid up in ±45° angles. However, this limitation is not limited to particular layup angles and other angles could be used to reach the loads of the coupling 20.

The top plate 320 and the bottom plate 330 are disposed at the top 156 and bottom 157 of the rotor assembly 15, respectively, and are supportive of the base element 300 relative to the rotor shaft 14. The top plate 320 has a central portion 321 that is formed to define a bore 322 aligned with the rotor shaft 14 and a series of flanges 323 extending outwardly from the central portion 321 to the base element 300. In the case of the rotor assembly 15 being a diamond, the top plate 320 has 4 such flanges 323, which are each connected to a corresponding one of the sides of the base element 300 via fastening elements 324. The bottom plate 330 has a central portion 331 that is formed to define a bore 332 aligned with the rotor shaft 14 and a series of flanges 333 extending outwardly from the central portion 331 to the base element 300. In the case of the rotor assembly 15 being a diamond, the bottom plate 330 has 4 such flanges 333, which are each connected to a corresponding one of the sides of the base element 330 via the fastening elements 324.

The central portions 321 and 331 of the top plate 320 and the bottom plate 330 may be substantially flat. By contrast, the flanges 323 and 333 of the top plate 320 and the bottom plate 330 may be tapered toward one another with increasing radial distance from the central portions 321 and 331 and the rotor shaft 14. The tapering of the flanges 323 defines a plane P2 for each side of the base element 300 and the tapering of the flanges 333 defines a plane P3 for each side of the base element 300. In some cases, a shape or angle of the tapering of the flanges 323 and 333 may be conical or frusto-conical.

Where the top plate 320 and the bottom plate 330 are formed of a composite of for example graphite or, more particularly, unidirectional graphite and epoxy, the epoxy serves as the matrix 31 and the graphite (or unidirectional graphite) is suspended within the matrix 31 as the planar or fibrous material 32 configured to extend longitudinally along the plane P2 (for the top plate 320) and along the plane P3 (for the bottom plate 330). As such, the loadings of the couplings 20 generated by centrifugal forces at the rounded corners 155 are also resolved by the top plate 320 and the bottom plate 330 with the material 32 in tension to the extent that the sides of the base element 330 pull on the top plate 320 and the bottom plate 330. In addition, the loadings of the couplings 20 generated by upwardly directed flapping of the rotor blades 130 are resolved by the bottom plate 330 with the material 32 in tension while the loadings of the couplings 20 generated by downwardly directed flapping of the rotor blades 130 are resolved by the top plate 320 with the material 32 in tension. While not required in all aspects, the material 32 can be laid up in ±45° angles although it is understood that other angles can be used and need not be the same as the angles used in the C-shaped channels 303.

Figure 8:
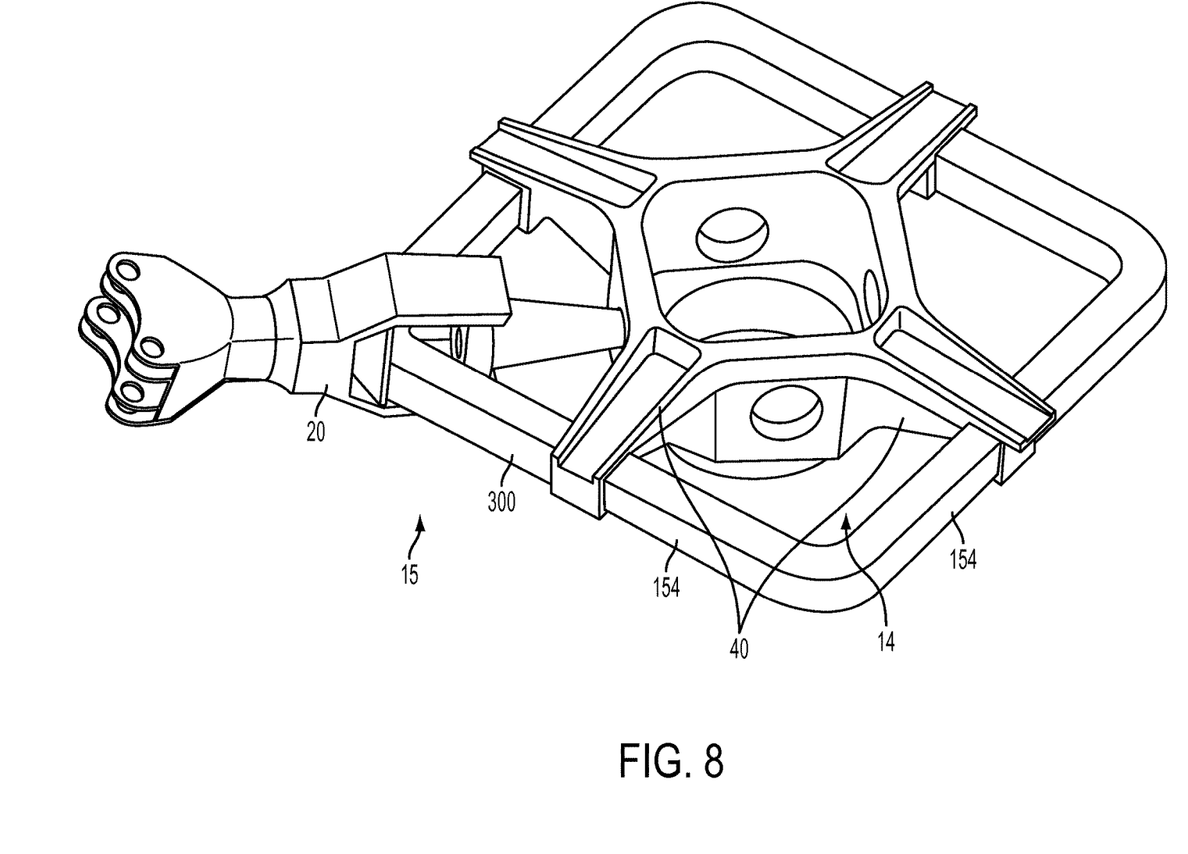
FIG. 8 is a perspective view of a rotor assembly of the aircraft of FIG. 1 in accordance with alternative embodiments.

With reference to FIG. 8 and, in accordance with an alternative or additional embodiment of the invention, the base element 300 and the hoop element (not shown in FIG. 8) may be provided substantially as described above but with the base element 300 coupled to the rotor shaft 14 by spoke elements 40. Such spoke elements 40 may be formed of titanium or another similar material and may be provided as four spoke elements 40 in the case of the diamond-shaped rotor assembly 15 with one spoke element 40 associated with each side 154.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown in the context of a coaxial helicopter, it is understood that aspects could be used in other types of rotary wing and fixed wing aircraft, wind turbines, industrial machinery, etc. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
   an airframe;
   a blade disk, which is rotatable relative to the airframe, including a plurality of rotor blades;
   a rotor shaft disposed to drive rotation of the blade disk relative to the airframe about an axis of rotation; and
   a rotor assembly comprising a composite laminate and couplings by which each of the plurality of rotor blades is coupled to the rotor shaft via the composite laminate, the couplings allowing a pitching of each of the plurality of rotor blades about corresponding pitch axes,
wherein the couplings comprise yoke elements and stem elements arranged with each of the yoke elements being interposed between a corresponding one of the plurality of rotor blades and the corresponding one of the stem elements, the corresponding one of the stem elements coupling the one of the yoke elements to the rotor shaft;
an inboard pitch bearing and an outboard pitch bearing disposed to permit pitching of a corresponding one of the plurality of rotor blades about a corresponding pitching axis while resisting flapping and leading and lagging; and
a thrust bearing disposed to permit radial movement, flapping and leading and lagging of a corresponding one of the plurality of rotor blades, and
wherein the composite laminate resolves pitching and centrifugal loading associated with the couplings in-plane of the composite laminate.

2. The aircraft according to claim 1, wherein the blade disk is disposed at an upper portion of the airframe and is provided as a first, upper blade disk and a second, lower blade disk and wherein the rotor shaft drives the first and second blade disks to rotate coaxially in opposite directions.

3. The aircraft according to claim 1, wherein each of the couplings permit pitching of the corresponding one of the plurality of rotor blades.

4. The aircraft according to claim 1, wherein the rotor assembly is polygonal with a number of rounded corners equaling a number of the rotor blades, each rounded corner defining a location of an a corresponding one of the couplings.

5. The aircraft according to claim 1, wherein the composite laminate comprises graphite and epoxy.

6. The aircraft according to claim 1, wherein the rotor assembly comprises multiple composite laminates, the multiple composite laminates comprising:
a composite laminate base element comprising an outward facing channel;
a composite laminate hoop element disposed in the outward facing channel; and
upper and lower composite laminate plate elements supportive of the composite laminate base element relative to the rotor shaft.

7. The aircraft according to claim 6, wherein the outward facing channel is c-shaped.

8. The aircraft according to claim 6, wherein the composite laminate hoop element comprises unidirectional graphite.

9. The aircraft according to claim 6, wherein the upper and lower composite laminate plate elements are tapered.

10. The aircraft according to claim 1, wherein the rotor assembly comprises multiple composite laminates, the multiple composite laminates comprising:
a composite laminate base element, which is formed to define an outward facing channel and which is coupled to the rotor shaft by spoke elements; and
a composite laminate hoop element disposed in the outward facing channel.

\* \* \* \* \*